(12) United States Patent
Brenner et al.

(10) Patent No.: US 6,250,420 B1
(45) Date of Patent: Jun. 26, 2001

(54) ELECTRICALLY ASSISTED AUTOMOTIVE POWER STEERING SYSTEM

(75) Inventors: Peter Brenner; Martin Budaker; Willi Nagel; Uwe Loreit, all of Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/530,409
(22) PCT Filed: Oct. 27, 1998
(86) PCT No.: PCT/EP98/06813
§ 371 Date: May 1, 2000
§ 102(e) Date: May 1, 2000
(87) PCT Pub. No.: WO99/21747
PCT Pub. Date: May 6, 1999

(30) Foreign Application Priority Data

Oct. 29, 1997 (DE) ............................................. 197 47 638

(51) Int. Cl.⁷ ...................................................... B62D 5/04
(52) U.S. Cl. ........................... 180/443; 180/444; 180/446
(58) Field of Search ..................................... 180/443, 444, 180/446

(56) References Cited

U.S. PATENT DOCUMENTS

| | | | |
|---|---|---|---|
| 4,173,265 | * 11/1979 | Kremer | 180/443 |
| 4,796,463 | * 1/1989 | Tsals et al. | 73/862.33 |
| 4,805,463 | * 2/1989 | Kelledes et al. | 73/862.33 |
| 4,874,053 | 10/1989 | Kimura et al. | |
| 4,886,137 | * 12/1989 | Pawlak et al. | 180/423 |
| 5,226,498 | * 7/1993 | Gutkowski et al. | 180/443 |
| 5,442,956 | * 8/1995 | Persson | 180/443 |
| 5,717,330 | * 2/1998 | Moreau et al. | 324/207.13 |
| 6,175,231 | * 1/2001 | Budaker et al. | 324/173 |

FOREIGN PATENT DOCUMENTS

| | | |
|---|---|---|
| 37 11 854 | 12/1989 | (DE) . |
| 198 28 513-A1 | * 12/1999 | (DE) . |
| 2000055753 | * 2/2000 | (JP) . |

* cited by examiner

Primary Examiner—Brian L. Johnson
Assistant Examiner—Daniel Yeagley
(74) Attorney, Agent, or Firm—Larson & Taylor PLC

(57) ABSTRACT

An electrically assisted power steering system for motor vehicles includes an input shaft (5), which is operatively connected to a steering wheel, for transmitting a steering torque required to steer the vehicle wheels that are to be steered. An output member is operatively connected to the wheels to be steered. A servomotor (7), by which an auxiliary force can be exerted on the input shaft (5) or the output member, is disposed in the power steering system. The input shaft (5) and the output member are connected to one another via a torsion bar (4). A detection unit for detecting a steering torque acting on the input shaft (5) includes one magnetic ring (12, 14) each, connected to the input shaft (5) and the output member, and one associated sensor (13, 15) each. Each magnetic ring (12, 14) has the same number of magnetic pole pairs. Each magnetic ring (12, 14) is assigned a sensor (13, 15), structurally connected to the housing, by which both the steering torque and the rotary speed of the input shaft (5) are detected.

8 Claims, 1 Drawing Sheet

ELECTRICALLY ASSISTED AUTOMOTIVE POWER STEERING SYSTEM

FIELD OF THE INVENTION

The invention relates to an electrically assisted power steering system for motor vehicles. The power steering system includes an input shaft, which is operatively connected to a steering and serves to transmit a torque required to steer vehicle wheels that are to be steered. An output member is operatively connected to the wheels to be steered. A servomotor, by which an auxiliary force can be exerted on the input shaft or the output member, is disposed in the power steering system. The input shaft and the output member are connected to one another via a rotationally elastic member in such a way that a limited torsional motion is possible between the input shaft and the output member. For contact-free detection of the direction and intensity of a steering torque acting on the input shaft, a contactless detection unit is used. The detection unit includes one pulse transducer and one sensor each connected to the input shaft and to the output member. The pulse transducers are embodied as magnetic rings, which are provided with magnetic north and south poles in alternating order on their circumferential surfaces.

BACKGROUND OF THE INVENTION

One such power steering system is known from German DE-C2 38 44 578, for instance. In this power steering system, two drums of nonmagnetic material are connected to an input shaft and to an output member, respectively. The drums are provided on their circumference with magnetizable media, in such a way to form magnetic north and south poles in alternation. By measuring the difference in the rotary angles of the two drums, the torque is detected, using magnetoresistive elements.

Detecting the torque makes it possible to regulate the servo assistance of an electric steering system. Regulating the servo assistance in an electric steering system purely as a function of torque feels unaccustomed during driving, because different friction conditions prevail then, compared to a hydraulically assisted power steering system. The "feedback" of the steering speed to the steering moment is missing. To overcome this disadvantage, it is necessary to detect the steering speed. For detecting the steering speed, in known electrical steering systems, for instance in German Patent DE-C2 37 11 854, one additional sensor is provided. The sensor has a direct current tachometer generator, for instance, which generates a direct current with a voltage adapted to the steering speed. This kind of steering speed sensor involves relatively major effort and expense for detecting the steering speed.

BRIEF SUMMARY OF THE INVENTION

The object of the invention is to improve the regulation of an electrically assisted power steering system of this generic type. In particular, it should be possible to detect the steering speed in addition, using simple means.

This object is attained by the power steering system of the present invention. This is accomplished in particular in that, in a power steering system of this generic type, the two magnetic rings are equipped with the same numbers of pole pairs, and that each magnetic ring is assigned one sensor, structurally connected to the housing, by which not only the relative position of the magnetic rings and hence the relative position of the input shaft and of the output member to one another, but also the rotary speed of the input shaft, are detected. By means of this embodiment, it is possible, with two magnetic rings and two sensors assigned to the magnetic rings, to detect both the torque and the rotary speed of the input shaft and thus the steering speed. By detecting the steering speed, the damping of the steering when turning and then straightening out again can be controlled. If an electric motor is used as the servomotor, then the steering speed can also be used as an additional controlled variable for regulating the engine rpm and can then lead to higher-quality regulation.

Expedient and advantageous features of the invention are defined by the dependent claims. For instance, a second magnetic ring, with an associated second sensor, can be disposed on the input shaft for detecting the steering angle. Once the steering angle is detected, the return to steering straight ahead can be actively varied. Furthermore, this makes center damping, to suppress overswings or overshooting, possible as the wheel returns to the center. Straightline stability of the vehicle is also improved.

Further advantages are precise centering on the straightahead driving position of the steering and the possibility of designing a characteristic curve as a function of the steering angle. This means that in the position for driving straight ahead, the characteristic curve is different from that in the parking range. In addition, the steering angle signal can be utilized for other vehicle control devices, such as an active chassis or a roll stabilizer.

The two magnetic rings that are disposed on the input shaft expediently have different numbers of pole pairs. With the two magnetic rings and the two associated sensors, an unambiguous determination of steering angle is possible at most in the range of only 180°. If the absolute angle position of the input shaft is to be determined, then the two sensors are assigned an electronic unit, by which, once the straightahead position has been determined once and for all, the steering angle traversed at a given time can be detected and stored in memory. To prevent the absolute steering angle from being lost if malfunctions occur, such as a electrical power failure, a third magnetic ring with an associated third sensor can disposed on the input shaft for detecting the absolute steering angle. The third magnetic ring is expediently connected to the input shaft via a speed-reduction gear, which by way of example is embodied in the manner of a "harmonic drive" gear.

BRIEF DESCRIPTION OF THE DRAWINGS

The invention will be described in further detail below in terms of an exemplary embodiment shown in the drawing. Shown are.

DETAILED DESCRIPTION OF THE INVENTION

Figure 2:
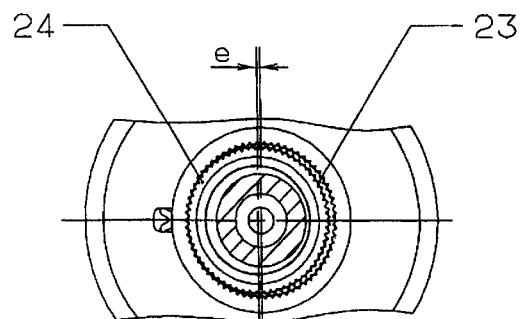
FIG. 2, the cross section taken along the line II—II of FIG. 1.

The invention will be described taking a power steering system with a rack-and-pinion gear as an example. With the same effectiveness, however, the invention can also be applied to other power steering systems, such as those with ball-and-nut-type power steering gears, or with a steering column split by the steering gear.

In a steering housing, or housing 1 for short, a pinion 3 connected to a pinion shaft 2 is rotatably supported. The pinion 3 acts as an output member, which is operatively connected with vehicle wheels, not shown, that are to be steered. In the case of a ball-and-nut-type power steering system, a threaded spindle takes the place of the pinion 3. The pinion shaft 2 is connected via a torsion bar 4 to an input shaft 5 of the steering gear. Instead of the torsion bar 4, some other rotationally elastic member can be used.

The pinion 3 is drivingly connected to an electric motor 7 via a toothed gearing or worm gear 6. A worm wheel 8 of the worm gear 6 is secured to the pinion shaft 2. Via a rack 10, the pinion 2 is also drivingly connected to the vehicle wheels to be steered.

Figure 1:
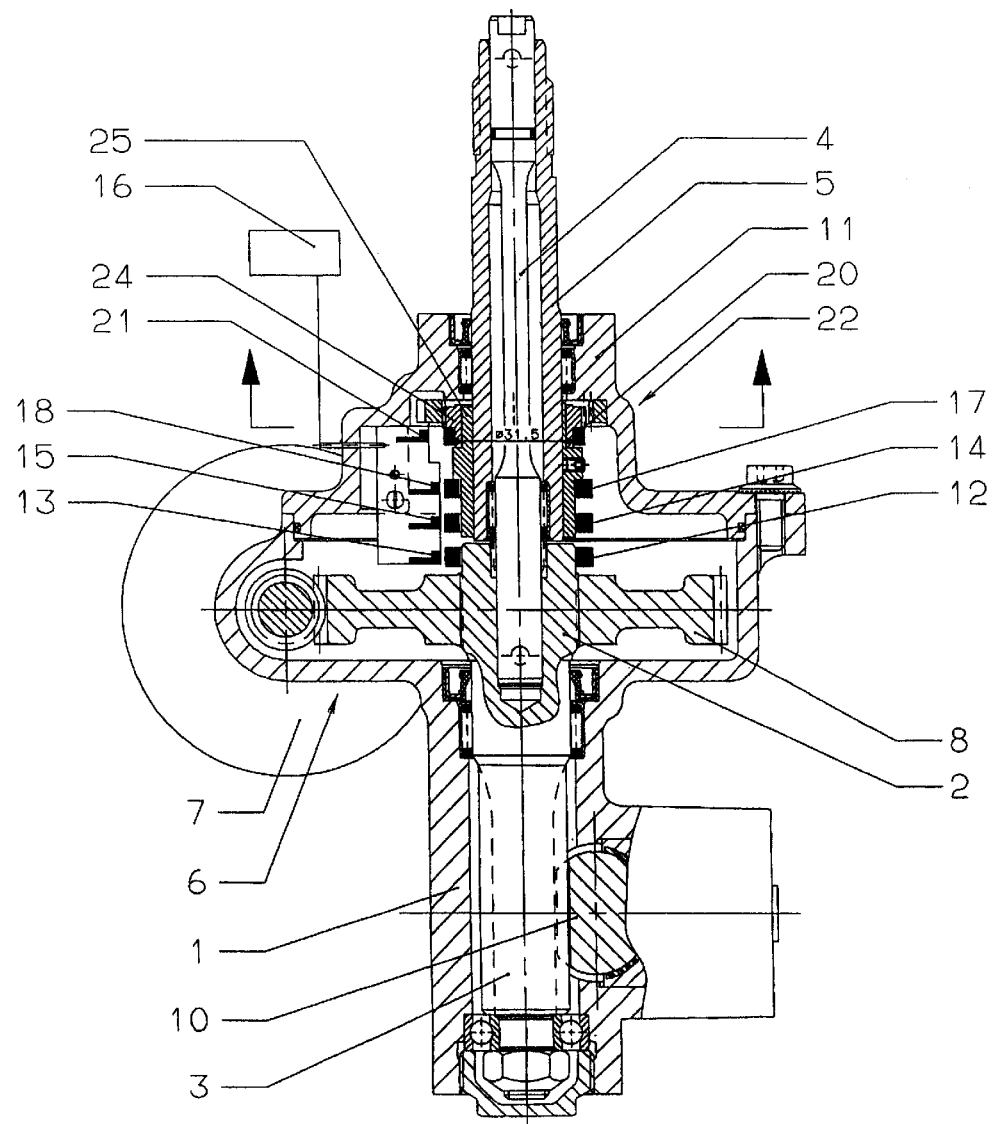
FIG. 1, a longitudinal section through the power steering system of the invention, taking a rack-and-pinion steering system as an example.

A sensor housing 11 is secured to a part of the housing 1; in the exemplary embodiment of FIG. 1, this is the upper part, adjacent to the input shaft 4.

A pulse transducer in the form of a magnetic ring 12 is disposed on the pinion shaft 2. The magnetic ring 12 cooperates with a sensor 13, which is retained in the sensor housing 11. On the input shaft 5, a first pulse transducer in the form of a magnetic ring 14 is secured adjacent to the magnetic ring 12. An associated sensor 15 is retained in the sensor housing 11. The two magnetic rings 12 and 14 are provided with magnetic north and south poles in alternating order on their circumferential surfaces. The two magnetic rings 12 and 14 each have the same number of pole pairs.

The signals of the two sensors 13 and 15 are detected and processed in an electronic unit 16. The torque is detected by way of the relative position of the two magnetic rings 12 and 14 to one another. A torque introduced to the input shaft 5 via the steering wheel is transmitted to the pinion shaft 2 via the torsion bar 4. Depending on the torque and on the spring characteristic curve of the torsion bar 4, this causes a relative torsion of the input shaft 5 with respect to the pinion shaft 2 and thus to a torsion of the magnetic ring 14 relative to the magnetic ring 12. The angle of torsion of the magnetic rings 12 and 14 to one another, for a given torsion bar 4, is accordingly dependent on the actuating moment at the steering wheel. The measured torque acts as a measured variable for the servo assistance and is carried on from the electronic unit 16 to the electric motor 7.

Besides the steering torque, the rotary speed of the input shaft 5 can be detected by the two magnetic rings 12 and 14 and the two sensors 13 and 15. By measuring the scanned poles of the magnetic rings and their derivation over time, the rotary speed can be calculated. If the horizontal and vertical vector components of the magnetic field are evaluated in addition, then, in the manner of an incremental transducer, the direction of rotation can be determined as well.

If a second magnetic ring 17 is mounted adjacent to the first magnetic ring 14 on the input shaft 5, and an associated sensor 18 is mounted in the sensor housing 11, then with these two magnetic rings 14 and 17 and the two sensors 15 and 18, the steering angle can be determined. This is made possible by providing that the two magnetic rings 14 and 17 have different numbers of pole pairs from one another. As a result, a conclusion can be drawn as to the steering angle at the time, via the respective position of the poles of the two magnetic rings 14 and 17 relative to one another. The steering angle determination by this method is limited to a range of a 180°. Accordingly, once the straight-ahead position has been determined once and for all, whatever steering angle has been traversed must be detected and stored in memory by the electronic unit 16, so that a conclusion can be drawn as to what the actual steering angle is.

In this arrangement, malfunctions, such as an electric power failure, can lead to errors. To preclude such errors, a third magnetic ring 20 with an associated sensor 21 is disposed on the input shaft 5. Like the other sensors, the sensor 21 is retained in the sensor housing 11. The magnetic ring 20, conversely, is connected to the input shaft 5 via a speed-reduction gear 22. This speed-reduction gear 22 is an internally toothed gear on the order of a "harmonic drive" gear. The speed-reduction gear 22 contains an externally toothed gear wheel 23 and an internally toothed ring gear 24. The ring gear 24 is supported in the sensor housing 11 in a manner fixed against relative rotation and concentrically with the axis of the input shaft 5. The gear wheel 23 is supported on a bushing 25 eccentrically, by the amount of an eccentricity "e", to the axis of the input shaft 5. The eccentricity "e" is equivalent to the axial spacing of the teeth. This speed-reduction gear 22 makes it possible to detect an absolute steering angle over the entire range of steering wheel revolutions.

The magnetic ring 20, which is solidly connected to the gear wheel 23, is provided with two pole pairs. In combination with the sensor 21, the absolute angular position can be detected over 90°. If a steering system with a total of four steering wheel revolutions is assumed as the basis, this means that in conjunction with the speed-reduction gear 22, as already mentioned, the absolute steering angle position can be detected over the entire steering range.

The magnetic rings 12, 14 and 20 and the sensors 13, 15 and 21, together with the electronic unit 16, form a detection unit for contactless detection of the direction and magnitude of a steering moment occurring at the input shaft 5, along with the steering speed and the steering angle. What is measured is the change in a magnetic field that is caused by a motion of the magnetic rings 12, 14 and 20.

In another possible embodiment, in which the electric motor 7 acts not on the pinion 3 but rather on the rack 10 or on the input shaft 5, or a steering column connected to the input shaft 5, the detection unit can be disposed at some other point in the power steering system.

What is claimed is:

1. An electrically assisted power steering system for a motor vehicle comprising:

a housing;

an input shaft in said housing which is operatively connectable to a steering wheel of the vehicle;

an output member in said housing which is operatively connectable to wheels of the vehicle to be steered;

a rotationally elastic member in said housing which connects said input shaft and said output shaft such that a limited torsional motion is possible between said input shaft and said output shaft;

a servomotor attached to said housing which exerts an auxiliary force on one of said input shaft or said output shaft;

a contact-free detector which a) includes a first input pulse transducer connected to said input shaft and an associated first input sensor for said first input pulse transducer connected to said housing, said first input transducer including a first input magnetic ring having a number of pairs of magnetic north and south poles in an alternating order about a circumferential surface thereof, b) includes an output pulse transducer connected to said output shaft and an associated output sensor for said output pulse transducer connected to said housing, said output transducer including an output magnetic ring having a same number as said first input magnetic ring of pairs of magnetic north and south poles in an alternating order about a circumferential surface thereof, c) detects with said first input sensor a rotary speed of said input shaft,
d) detects with said first input sensor and said output sensor a relative position of said first input magnetic ring and said output magnetic ring and hence a relative position of said input shaft and output member whereby a direction and an intensity of a steering torque action on said input shaft is detected by changes in the relative position,
e) includes a second input pulse transducer connected to said input shaft and an associated second input sensor for said second input pulse transducer connected to said housing, said second input transducer including a second input magnetic ring having a different number as said first input magnetic ring of pairs of magnetic north and south poles in an alternating order about a cireumferential surface thereof,
f) detects with said second input sensor a steering angle of the input shaft;
g) includes an electronic unit to which said first input sensor, said output sensor and said second input sensor are connected, said electronic unit detecting the steering angle at a plurality of revolutions of said input shaft,
h) includes a third input pulse transducer, a speed-reduction gear which connects said third input magnetic ring to said input shaft, and an associated third input sensor for said third input pulse transducer connected to said housing, said third input transducer including a third input magnetic ring having pairs of magnetic north and south poles in an alternating order about a circumferential surface thereof, and
i) detects with said third input sensor an absolute steering angle of said input shaft.

2. An electrically assisted power steering system as claimed in claim 1, wherein said speed-reduction gear is a harmonic drive gear.

3. An electrically assisted power sterring system as claimed in claim 2, wherein said second input magnetic ring has two pole pairs.

4. An electrically assisted power sterring system as claimed in claim 3, wherein said servomotor is an electric motor.

5. An electrically assisted power steering system as claimed in claim 2, wherein said servomotor is an electric motor.

6. An electrically assisted power steering system as claimed in claim 1, wherein said second input magnetic ring has two pole pairs.

7. An electrically assisted power sterring system as claimed in claim 6, wherein said servomotor is an electric motor.

8. An electrically assisted power steering system as claimed in claim 1, wherein said servomotor is an electric motor.

* * * * *